April 27, 1926.
J. B. J. A. VIGNERON
TRAWLING GEAR
Filed Feb. 8, 1922
1,582,710
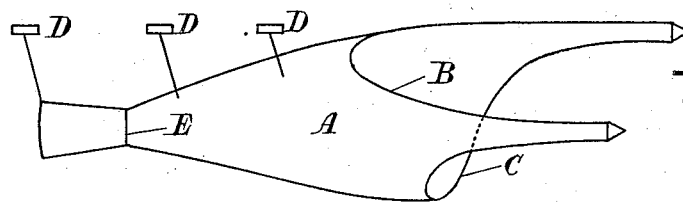
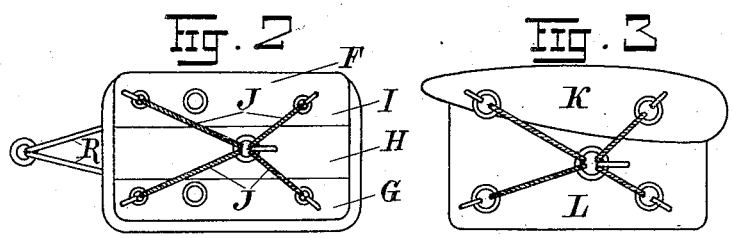
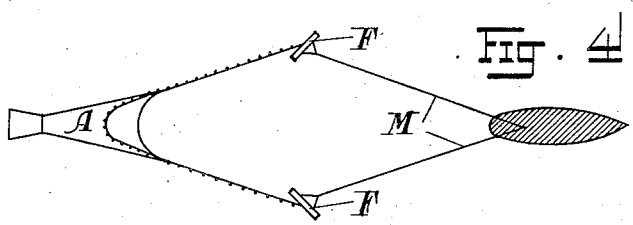
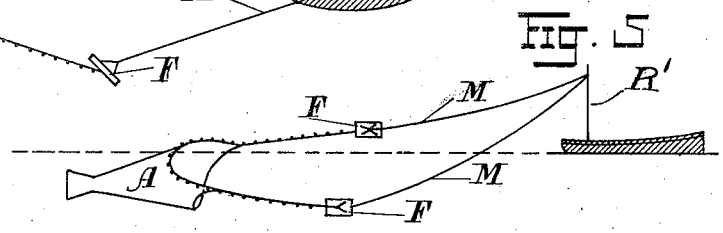
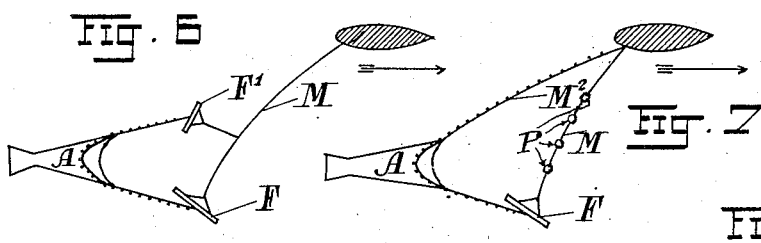
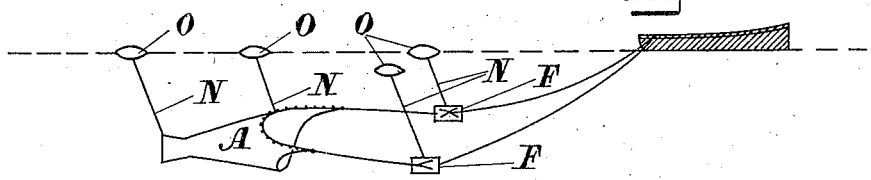
INVENTOR:
Jean B. J. A. Vigneron
By Wm Wallace White
ATTY.

Patented Apr. 27, 1926.

1,582,710

UNITED STATES PATENT OFFICE.

JEAN-BAPTISTE-JOSEPH-ALPHONSE VIGNERON, OF MARSEILLE, FRANCE.

TRAWLING GEAR.

Application filed February 8, 1922. Serial No. 535,083.

*To all whom it may concern:*

Be it known that I, JEAN-BAPTISTE-JOSEPH-ALPHONSE VIGNERON, a citizen of the French Republic, residing at Fourmiguier, Marseille, France, have invented a new and useful Improvement in Trawling Gears, of which the following is a specification.

This invention relates to trawling gear in which separating boards are used for opening the net and in which the net is connected to the boards by relatively long cables, the present invention being an improvement in part on that shown and described in my Patent No. 1,440,854.

The object of the invention is to provide means whereby fishing on the surface or in a submerged condition may be effected in a simple and efficient manner.

Another object of the invention is to provide means whereby the trawling gear can be adapted according to the peculiar characteristics of the fish it is desired to catch.

According to the present invention the trawling net used consists in a bottom trawling net of similar construction to the "filet de boeuf" or "gangui" (nets in common use in the Mediterranean fisheries) or the like, but having its head rope either vertically above or extending rearwardly of the foot rope, while floats and weights are provided for maintaining the net floating in an open condition either at the surface or submerged. According to a further feature of the invention means are provided whereby the force tending to separate the towing cables is greater on the one cable than the other so that the net is made to follow a track on one side or the other of the trawler's wake. These and other features of the invention will now be described with reference to the accompanying drawing in which:—

Fig. 1 is a perspective view of the net constructed according to the present invention.

Figs. 2 and 3 are views in elevation of two forms of separating panels or boards.

Figs. 4 and 5 are plan and perspective views respectively showing the trawling gear in action.

Figs. 6 and 7 are plan views showing two methods of towing the net to the side of the wake of the trawler.

Fig. 8 shows another arrangement.

The net shown at A resembles a "filet de boeuf" net or "gangui" or any other similar net, which has vertically been turned upside down. The head rope B of the float portion being more to the rear than the foot rope C of the weighted portion, which is contrary to the arrangement in a bottom trawl net. In the present case the head rope B works in the same horizontal plane at the surface of the water while the foot rope C of the weighted portion describes a diving curve.

Above the net cork floats D or floats of any other suitable material are arranged, which by means of thin cables enable the net to be maintained coaxial with the horizontal axis of its opening even when the net contains fish.

A throttle or contracted part provided with a veil or curtain E prevents the fish caught from escaping. The surface panels which ensure the opening of the device in the direction of its width are constructed according to either of the forms shown in Figs. 2 and 3.

In Fig. 2 plate or board F is shown which comprises three longitudinal strips, the lower strip made of hard heavy wood. The intermediate strip H is of lighter wood. The upper part 1 is formed either of a cork lining, or of a zinc float assuming the same form as the two strips previously mentioned. The iron brackets are replaced by four manila or hempen ropes J attached to the four corners of the board and connected with the swivel to which the towing hawser is attached.

The whole is weighted so that the board acts as nearly in a vertical plane as possible.

In Fig. 3 a torpedo shaped float K of cork or hollow metal or other suitable material supporting along its lower side a sort of rudder or centre board L of sheet metal or wood which is intended to function as the separating board. The float K and board L are connected to the towing cable by four ropes arranged in a similar way to those of the board shown in Fig. 3.

The boards F (Figs. 4, 5, 6 and 7) are not fixed to the net itself but are at a greater or lesser distance from it according to circumstances and are connected thereto by manila cables M held on the surface by floats or corks. The cables are attached to the outer face of the panel or of the float by means of a duck's foot R (Fig. 2).

In the action of the apparatus, two cases arise:—

When fish are very abundant or of a kind which is not easily scared, the device is operated in the wake of the boat (Fig. 4) both boards F being of similar dimensions and arrangements.

The boards ensure the necessary separation or spreading of the cables and the net, which spreading increases with the speed or the length of the cables connecting the boards to the boat. The action of the net itself is increased by that of the panels and the portion of the cables supported by the floats; the panels and cables driving the fish down towards the net. A point to be observed is that the fish which may be scattered or separated by the passage of the boat are again driven down towards the net. The towing cables are attached as high as possible to the mast R' of the boat (Fig. 5) so as to drag in the water as little as possible in front of the boards and so as not to scare the fish which is more likely to occur as the net is nearer the boat.

If the net is at a distance from the boat heavy cables (if necessary weighted) on the contrary are employed, said cables being attached to the rail of the boat similarly to those of the bottom net or trawl as shown in Fig. 8. Due to the weight of these cables or to weights provided thereon, said cables will describe a descending curve below the fishing surface so that they do not frighten the fish. Fig. 8 also shows that torpedo shaped floats O may be connected to the net and also to the boards.

In some cases it is however preferable for the net to follow a different course to that of the boat, say to starboard or to port or to both sides at once if the power of the boat allows of it. For this purpose the board on the side of the net which will be remote from the trawler is made of relatively large dimension. This board then diverts the net from the wake of the boat and gives it a course parallel therewith.

The opening of the other arm of the net is ensured either by means of a cable $M^2$ (Fig. 7) directly connected with the boat or by means of a smaller board $F^1$ (Fig. 6) connected with the cable controlling the large board. This arrangement may be used at all depths. If necessary weights P (Fig. 7) may be provided on the cable M which connects the boat with the board F, whereby said cable will plunge below the fishing area. The towing cables may also be attached as high as possible to the mast of the boat as described above.

Having now particularly described and ascertained the nature of my said invention and in what manner the same is to be performed, I declare that what I claim is:—

1. A trawling gear, comprising a net, tow-ropes secured respectively on either side of the net mouth, means unsymmetrically disposed on said tow-ropes for spreading the net mouth and oblige said net to travel outside the wake of the trawling boat.

2. A trawling gear, comprising a net, a single shear-board connected to one side of the net mouth for spreading said net mouth and obliging said net to travel outside the wake of the trawling boat.

3. A trawling gear, comprising a net, a single shear-board, a cable connecting said board to one side of the net mouth, a tow-rope connecting said shear-board to the trawling boat, a tow-rope connecting the other side of the net mouth to the trawling boat.

4. A trawling gear, comprising a net, a single shear-board for spreading the net mouth and obliging said net to travel outside the wake of the trawling boat, a tow-rope connecting said board to the boat, this tow-rope being secured to the inner face of the board by means of four divergent strands attached respectively to the corners of said board, a cable connecting the board to one side of the net mouth, this cable being secured to the outer face of the board and intermediate the center and the hind edge thereof, by means of a two stranded crow foot, and a tow rope connecting the other end of the net mouth to the trawling boat.

5. A trawling gear, comprising a net, a shear board for horizontally spreading the net mouth and obliging the net to travel outside the wake of the trawling boat, means for connecting the board to one side of the net mouth, a tow rope for connecting the board to the boat, weights provided on said tow-rope whereby the latter is caused to plunge under the fishing strata in order not to scare the fish.

In witness whereof, I have hereunto signed my name this 25th day of January, 1921.

JEAN-BAPTISTE-JOSEPH-ALPHONSE VIGNERON.